United States Patent
Suguro et al.

(10) Patent No.: US 9,425,480 B2
(45) Date of Patent: Aug. 23, 2016

(54) SECONDARY BATTERY

(75) Inventors: Masahiro Suguro, Tokyo (JP); Daisuke Kawasaki, Tokyo (JP); Midori Shimura, Tokyo (JP); Kazuaki Matsumoto, Tokyo (JP); Yoko Hashizume, Tokyo (JP)

(73) Assignee: NEC CORPORATION, Tokyo (JP)

( * ) Notice: Subject to any disclaimer, the term of this patent is extended or adjusted under 35 U.S.C. 154(b) by 610 days.

(21) Appl. No.: 13/820,314

(22) PCT Filed: Aug. 25, 2011

(86) PCT No.: PCT/JP2011/069169
§ 371 (c)(1),
(2), (4) Date: Mar. 1, 2013

(87) PCT Pub. No.: WO2012/029625
PCT Pub. Date: Mar. 8, 2012

(65) Prior Publication Data
US 2013/0164603 A1 Jun. 27, 2013

(30) Foreign Application Priority Data
Sep. 2, 2010 (JP) ................................ 2010-196618

(51) Int. Cl.
*H01M 10/056* (2010.01)
*H01M 10/0569* (2010.01)
(Continued)

(52) U.S. Cl.
CPC ........ *H01M 10/0525* (2013.01); *H01M 2/0267* (2013.01); *H01M 2/0285* (2013.01); *H01M 2/0287* (2013.01); *H01M 4/621* (2013.01); *H01M 4/622* (2013.01); *H01M 10/056* (2013.01); *H01M 10/0567* (2013.01); *H01M 10/0569* (2013.01); *H01M 10/0585* (2013.01); *Y02E 60/122* (2013.01); *Y02T 10/7011* (2013.01)

(58) Field of Classification Search
CPC H01M 4/134; H01M 10/056; H01M 10/0569
USPC ........................................................ 429/163
See application file for complete search history.

(56) References Cited

U.S. PATENT DOCUMENTS

2004/0096736 A1* 5/2004 Fujita .................... H01M 4/362
429/188
2007/0054186 A1* 3/2007 Costello ............ H01M 10/0569
429/200

(Continued)

FOREIGN PATENT DOCUMENTS

JP 06-176768 A 6/1994
JP 06-325765 A 11/1994

(Continued)

Primary Examiner — Basia Ridley
Assistant Examiner — James Erwin
(74) Attorney, Agent, or Firm — Sughrue Mion, PLLC

(57) ABSTRACT

The object is to provide a secondary battery with higher performance, and especially to provide a secondary battery having low impedance. An exemplary embodiment of the invention is a secondary battery, comprising an electrode assembly in which a positive electrode and a negative electrode are oppositely disposed, an electrolyte liquid, and a package which encloses the electrode assembly and the electrolyte liquid inside; wherein the negative electrode is formed by binding a negative electrode active substance to a negative electrode collector with a negative electrode binder; and wherein the electrolyte liquid comprises a fluorine-containing cyclic ether compound.

19 Claims, 1 Drawing Sheet

(51) Int. Cl.
  *H01M 10/0525* (2010.01)
  *H01M 2/02* (2006.01)
  *H01M 4/62* (2006.01)
  *H01M 10/0567* (2010.01)
  *H01M 10/0585* (2010.01)

(56) References Cited

U.S. PATENT DOCUMENTS

2009/0297929 A1* 12/2009 Uchida ............ H01M 10/0431
              429/94
2010/0055563 A1* 3/2010 Nakanishi ............ H01M 4/364
              429/209

FOREIGN PATENT DOCUMENTS

| | | |
|---|---|---|
| JP | 08-037024 A | 2/1996 |
| JP | 09-007635 A | 1/1997 |
| JP | 11-329491 A | 11/1999 |
| JP | 2003-123740 A | 4/2003 |
| JP | 2003-297420 A | 10/2003 |
| JP | 2003-297421 A | 10/2003 |
| JP | 2004-047404 A | 2/2004 |
| JP | 2007-042393 A | 2/2007 |
| JP | 2007-197370 A | 8/2007 |
| JP | 2008-016446 A | 1/2008 |
| JP | 2009-205950 A | 9/2009 |

* cited by examiner

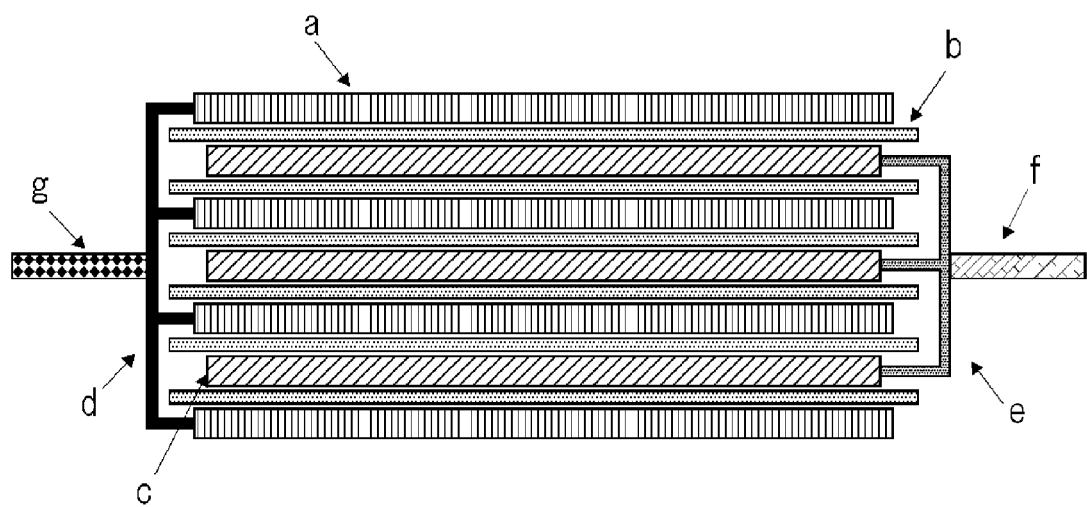

SECONDARY BATTERY

CROSS REFERENCE TO RELATED APPLICATIONS

This application is a National Stage of International Application No. PCT/JP2011/069169, filed on Aug. 25, 2011, which claims priority from Japanese Patent Application No. 2010-196618, filed Sep. 2, 2010, the contents of all of which are incorporated herein by reference in their entirety.

TECHNICAL FIELD

An exemplary embodiment of the invention relates to a secondary battery, and particularly to a lithium ion secondary battery.

BACKGROUND ART

With the rapidly expansion of the market for laptop computers, mobile phones, electric vehicles, and the like, a secondary battery having a high energy density is required. Examples of a method for obtaining a secondary battery having a high energy density include a method in which a negative electrode material having a large capacity is used, and a method in which an electrolyte liquid having excellent stability is used.

Patent document 1 discloses using a silicon oxide or a silicate as a negative electrode active substance of a secondary battery. Patent document 2 discloses a negative electrode for a secondary battery which has an active substance layer containing a carbon material particle that can absorb and desorb lithium ion, a metal particle that can be alloyed with lithium, and an oxide particle that can absorb and desorb lithium ion. Patent document 3 discloses a negative electrode material for a secondary battery which is formed by coating the surface of a particle, which has a structure in which a silicon fine crystal is dispersed in a silicon compound, with carbon.

Patent document 4 discloses an electrolyte liquid which contains a cyclic oxocarbon anion having the following structure.

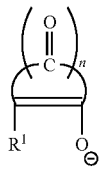

(In the formula, $R^1$ represents one group selected from the group consisting of hydrocarbon groups with a carbon number of 1 to 12, halogen-substituted hydrocarbon groups, alkoxy groups, thioether groups, amino groups, amide groups and acyl group. n is an integer of 1 to 6).

Patent document 5 discloses a secondary battery in which a negative electrode consisting of lithium or a lithium compound is used and in which a halogen atom-substituted cyclic ether with a three-membered or four-membered ring is used as an solvent of an electrolyte liquid.

CITATION LIST

Patent Document

Patent document 1: JP 06-325765 A
Patent document 2: JP 2003-123740 A
Patent document 3: JP 2004-47404 A
Patent document 4: JP 2007-197370 A
Patent document 5: JP 06-176768 A

SUMMARY OF THE INVENTION

Problem to be Solved by the Invention

However, when charging and discharging are carried out at 45° C. or higher in the case where the silicon oxide disclosed in Patent document 1 is used as a negative electrode active substance, there has been a problem in which capacity deterioration associated with the charge/discharge cycle may become significantly large.

The negative electrode for a secondary battery disclosed in Patent document 2 has an effect in which the volume change of the negative electrode as a whole is relaxed due to the different charge/discharge electric potential of three kinds of components when lithium is absorbed and desorbed. However, in Patent document 2, there have been some points which have not been sufficiently studied, regarding a relationship among three kinds of components in a state of coexistence, and regarding the binder, an electrolyte liquid, a conformation of an electrode assembly, and a package which are indispensable for fabricating a lithium ion secondary battery.

The negative electrode material for a secondary battery disclosed in Patent document 3 also has an effect in which the volume change of the negative electrode as a whole is relaxed. However, in Patent document 3, there have been some points which have not been sufficiently studied, regarding a binder, an electrolyte liquid, a conformation of an electrode assembly, and a package which are indispensable for fabricating a lithium ion secondary battery.

The electrolyte liquid disclosed in Patent document 4 is supposed to have excellent ionic conductivity, but there have been some points which have not been sufficiently studied, regarding a negative electrode active substance, a conformation of an electrode assembly, and a package which are indispensable for fabricating a lithium ion secondary battery.

As for the electrolyte liquid disclosed in Patent document 5, there have been some points which have not been sufficiently studied, regarding a negative electrode active substance, a negative electrode binder, a conformation of an electrode assembly, and a package which are indispensable for fabricating a lithium ion secondary battery.

Thus, an object of an exemplary embodiment of the invention is to provide a secondary battery with higher performance, especially to provide a lithium ion secondary battery having a low impedance.

Means for Solving the Problem

An exemplary embodiment of the invention is a secondary battery, comprising an electrode assembly in which a positive electrode and a negative electrode are oppositely disposed, an electrolyte liquid, and a package which encloses the electrode assembly and the electrolyte liquid inside; wherein the negative electrode is formed by binding a negative electrode active substance to a negative electrode collector with a negative electrode binder; and wherein the electrolyte liquid comprises a fluorine-containing cyclic ether compound.

Effect of the Invention

In an exemplary embodiment of the invention, by using an electrolyte liquid comprising a fluorine-containing cyclic ether compound, the impedance of the battery can be reduced.

BRIEF DESCRIPTION OF DRAWINGS

FIG. 1 is a schematic cross-sectional view showing a conformation of an electrode assembly in a stacked laminate type secondary battery.

MODE FOR CARRYING OUT THE INVENTION

In secondary batteries, particularly in aluminum laminate cells, there may be a problem in which gas consisting of $CO_2$ is generated by decomposition of an electrolyte liquid having a carbonate structure. Thus, the inventors has thought that generation of $CO_2$ is suppressed by using a compound having no carbonate structure in the molecule, and have focused attention on an ether compound. Examples of the structure of the ether compound include linear type and cyclic type. As a result of their study, it has been found that the use of a cyclic ether compound for electrolyte liquid makes the dielectric constant of the electrolyte liquid higher than in the case of using a linear ether compound, and thereby that dissociation of the supporting salt such as $LiPF_6$ can be promoted and the output property (rate property) of the battery can be improved. Also, when the inventors have further earnestly studied, it has been found that the impedance of the battery can be reduced by further using a fluorine-containing cyclic ether compound having a fluorine atom.

Therefore, in a secondary battery of the exemplary embodiment of the invention, an electrolyte liquid containing a fluorine-containing cyclic ether compound is used. The reasons explaining the cause of the reduction of impedance by using a fluorine-containing cyclic ether compound are considered to be the following. Since the fluorine-containing cyclic ether compound has a higher energy level of HOMO (highest occupied molecular orbital) than that of general ether compounds, oxidation resistance becomes high and reductive decomposition easily occurs on the surface of the negative electrode. Also, since reductive decomposition of the fluorine-containing cyclic ether compound selectively occurs on the surface of the negative electrode in comparison with another solvent used for the electrolyte liquid, a good coating film containing LiF can be formed on the negative electrode. Thus, it is thought that ionic conductivity of an electrode interface is improved and impedance of the battery is reduced. Note that, the above-mentioned reasoning is just an assumption and does not limit the present invention.

The exemplary embodiment of the invention is explained in detail, as follows.

In a secondary battery according to the exemplary embodiment of the invention, an electrode assembly in which a positive electrode and a negative electrode are oppositely disposed and an electrolyte liquid are enclosed inside a package. As for the shape of the secondary battery, cylindrical type, flattened spiral square type, stacked square type, coin type, flattened spiral laminate type and stacked laminate type can be used, but stacked laminate type is preferable. A stacked laminate type secondary battery is explained, as follows.

FIG. 1 is a schematic cross-sectional view showing a conformation of an electrode assembly in a stacked laminate type secondary battery. This electrode assembly is formed by alternately stacking plural positive electrodes c and plural negative electrodes a with separator b placed therebetween. Positive electrode collector e in each positive electrode c is electrically connected by being welded to one another at the end part thereof which is not covered with a positive electrode active substance, and further positive electrode terminal f is welded to the welded part. A negative electrode collector d in each negative electrode a is electrically connected by being welded to one another at the end part thereof which is not covered with a negative electrode active substance, and further negative electrode terminal g is welded to the welded part.

There is an advantage in the electrode assembly having such a planar stacking conformation that it is hardly affected by volume change of the electrode that is associated with charging and discharging, in comparison with an electrode assembly having a spiral conformation because there is no part having a small R (an area near the spiral center of the spiral conformation). That is, it is useful as an electrode assembly in which an active substance which easily generates volume change is used.

[1] Negative Electrode

A negative electrode is formed by binding a negative electrode active substance on a negative electrode collector with a negative electrode binder.

A negative electrode active substance in the exemplary embodiment of the invention is not particularly limited, and can contain, for example, at least one selected from among metal (a) that can be alloyed with lithium, metal oxide (b) that can absorb and desorb lithium ion, and carbon material (c) that can absorb and desorb lithium ion. Also, the negative electrode active substance preferably contains at least one selected from among metal (a) that can be alloyed with lithium and metal oxide (b) that can absorb and desorb lithium ion. Further, the negative electrode active substance more preferably contains metal (a) that can be alloyed with lithium, metal oxide (b) that can absorb and desorb lithium ion, and carbon material (c) that can absorb and desorb lithium ion.

As metal (a), Al, Si, Pb, Sn, In, Bi, Ag, Ba, Ca, Hg, Pd, Pt, Te, Zn, La or an alloy of two or more kinds of the elements thereof can be used. In particular, it is preferable to contain silicon (Si) as metal (a). Metal (a) can be used alone, or in combination with another material, but is preferably in a range of 5 mass % or more and 90 mass % or less in the negative electrode active substance, and more preferably in a range of 20 mass % or more and 50 mass % or less.

As metal oxide (b), silicon oxide, aluminum oxide, tin oxide, indium oxide, zinc oxide, lithium oxide or a complex thereof can be used. In particular, it is preferable to contain silicon oxide as metal oxide (b). This is because silicon oxide is relatively stable and is hard to cause a reaction with another chemical compound. Also, one element or two or more elements selected from among nitrogen, boron and sulfur can be added as metal oxide (b), for example, in the amount of 0.1 to 5 mass %. By this, the electroconductivity of metal oxide (b) can be improved. Metal oxide (b) can be used alone, or in combination with another material, but is preferably in a range of 5 mass % or more and 90 mass % or less in the negative electrode active substance, and more preferably in a range of 40 mass % or more and 70 mass % or less.

As carbon material (c), graphite, amorphous carbon, diamond-like carbon, carbon nanotube or a complex thereof can be used. Here, graphite having high crystallinity has high electroconductivity and excellent adhesiveness with a positive electrode collector consisting of metal such as copper or the like as well as excellent voltage flatness. On the other hand, since amorphous carbon having low crystallinity has relatively low volume expansion, there is a significant effect of relaxing the volume expansion of the entire negative electrode, and deterioration due to ununiformity such as a crystal grain boundary or a defect hardly occurs. Carbon material (c) can be used alone, or in combination with another material, but is preferably in a range of 2 mass % or more and 80 mass % or less in the negative electrode active substance, and more preferably in a range of 2 mass % or more and 30 mass % or less.

In the case where the negative electrode active substance contains metal oxide (b), as for metal oxide (b), all or a part thereof preferably has an amorphous structure. Metal oxide (b) having an amorphous structure can suppress the volume expansion of carbon material (c) or metal (a) that are another negative electrode active substance and can also suppress the decomposition of an electrolyte liquid containing a phosphate compound. This mechanism is not obvious, but the amorphous structure of metal oxide (b) is assumed to have some influence on coating formation at the interface between carbon material (c) and the electrolyte liquid. Also, it is assumed that the amorphous structure has a relatively small constituent due to ununiformity such as a crystal grain boundary or a defect. Note that, it can be confirmed by X-ray diffraction measurement (general XRD measurement) that all or a part of metal oxide (b) has an amorphous structure. Specifically, in the case where metal oxide (b) does not have an amorphous structure, a peak peculiar to metal oxide (b) is observed, while in the case where all or a part of metal oxide (b) has an amorphous structure, a observed peak peculiar to metal oxide (b) becomes to be broad.

Also, in the case where the negative electrode material contains metal (a) and metal oxide (b), metal oxide (b) is preferably an oxide of a metal which constitutes metal (a). Also, as for metal (a), all or a part thereof is dispersed in metal oxide (b). The dispersion of at least a part of metal (a) in metal oxide (b) can suppress the volume expansion of the negative electrode as a whole and can also suppress decomposition of an electrolyte liquid. Note that, it can be confirmed by transmission electron microscope observation (general TEM observation) and along with energy dispersive X-ray spectroscopy measurement (general EDX measurement) that all or a part of metal (a) is dispersed in metal oxide (b). Specifically, a section of a specimen of metal particle (a) is observed and oxygen atom concentration of metal particle (a) which is dispersing in metal oxide (b) is measured, and thereby it can be confirmed that a metal which constitutes metal particle (a) does not become an oxide.

A negative electrode active substance, in which metal (a), metal oxide (b) and carbon material (c) are contained, in which all or a part of metal oxide (b) has an amorphous structure and in which all or a part of metal (a) is dispersed in metal oxide (b), can be produced, for example, by the method disclosed in Patent document 3. That is, CVD processing of metal oxide (b) is carried out under an atmosphere containing organic substance gas such as methane gas, to obtain a complex in which metal (a) in metal oxide (b) is a nanocluster and in which the surface is covered with carbon material (c). Also, the above-mentioned negative electrode active substance is also produced by mixing carbon material (c), metal (a) and metal oxide (b) by mechanical milling.

As mentioned above, the negative electrode active substance preferably contains metal (a), metal oxide (b) and carbon material (c), but the ratio of metal (a), metal oxide (b) and carbon material (c) is not particularly limited. The content of metal (a), the content of metal oxide (b) and the content of carbon material (c) with respect to the total of metal (a), metal oxide (b) and carbon material (c) are preferably 5 mass % more and 90 mass % or less, 5 mass % more and 90 mass % or less, and 2 mass % more and 80 mass % or less, respectively. Also, the content of metal (a), the content of metal oxide (b) and the content of carbon material (c) with respect to the total of metal (a), metal oxide (b) and carbon material (c) are more preferably 20 mass % more and 50 mass % or less, 40 mass % more and 70 mass % or less, and 2 mass % more and 30 mass % or less, respectively.

Also, each of metal (a), metal oxide (b) and carbon material (c) that is used can be, but should not particularly be limited to, a particle thereof. For example, the average particle diameter of metal (a) can be constituted in a range smaller than the average particle diameter of carbon material (c) and the average particle diameter of metal oxide (b). By this constitution, since metal (a), in which the volume change associated with charge and discharge is small, has a relatively small particle diameter, and since carbon material (c) and metal oxide (b), in which the volume change is large, has a relatively large particle diameter, dendrite generation and the pulverization of alloy are more effectively suppressed. Also, in the process of charge and discharge, lithium is absorbed and desorbed from the larger diameter particle, the smaller diameter particle and the larger diameter particle in this order. From this point, the residual stress and the residual strain are suppressed. The average particle diameter of metal (a) can be, for example, 20 μm or less, and is preferably 15 μm or less.

Also, it is preferable that the average particle diameter of metal oxide (b) be a half or less of the average particle diameter of carbon material (c), and it is preferable that the average particle diameter of metal (a) be a half or less of the average particle diameter of metal oxide (b). Further, it is more preferable that the average particle diameter of metal oxide (b) be a half or less of the average particle diameter of carbon material (c) as well as that the average particle diameter of metal (a) be a half or less of the average particle diameter of metal oxide (b). Controlling the average particle diameter in this range can more advantageously give the effect of relaxing the volume expansion of the metal and alloy phase, and can provide a secondary battery having an excellent balance of an energy density, a cycle life and an efficiency. More specifically, it is preferable that the average particle diameter of silicon oxide (b) be a half or less of the average particle diameter of graphite (c) and that the average particle diameter of silicon (a) be a half or less of the average particle diameter of silicon oxide (b). Also, more specifically, the average particle diameter of silicon (a) can be, for example, 20 μm or less, and is preferably 15 μm or less.

As a negative electrode binder, a polyvinylidene fluoride (PVdF), a vinylidene fluoride-hexafluoropropylene copolymer, a vinylidene fluoride-tetrafluoroethylene copolymer, a styrene-butadiene copolymerized rubber, a polytetrafluoroethylene, a polypropylene, a polyethylene, a polyimide (PI), a polyamide-imide (PAI) or the like can be used. Among these, from the standpoint of strong binding property, a polyimide or a polyamide-imide is preferable. The amount of the negative electrode binder used is preferably 5 to 25 parts by weight with respect to 100 parts by weight of the negative electrode active substance, from the standpoint of "sufficient binding force" and "high energy" which are trade-off to each other.

A negative electrode collector is not particularly limited, but aluminum, nickel, copper, silver and alloying thereof are preferable from the electrochemical stability. Examples of the shape thereof include foil, flat plate and mesh.

A negative electrode can be produced by forming a negative electrode active substance layer containing a negative electrode active substance and a negative electrode binder on a negative electrode collector. Examples of the method of forming the negative electrode active substance layer include doctor blade method, die coater method, CVD method, and sputtering method. A negative electrode active substance layer is first formed, and a thin film of aluminum, nickel or an alloy thereof is thereafter formed by vapor deposition, sputtering or the like to obtain the negative electrode collector.

[2] Positive Electrode

A positive electrode is formed, for example, by binding a positive electrode active substance on a positive electrode collector with a positive electrode binder so that the positive electrode active substance covers the positive electrode collector.

Examples of the positive electrode active substance include lithium manganates having a lamellar structure or lithium manganates having a Spinel structure including $LiMnO_2$ and $Li_xMn_2O_4$ (0<x<2); $LiCoO_2$, $LiNiO_2$ and materials in which a part of transition metal thereof are substituted with another metal; lithium transition metal oxides such as $LiNi_{1/3}Co_{1/3}Mn_{1/3}O_2$ in which the molar ratio of a particular transition metal is not more than one half; and materials which have lithium at a larger amount than the stoichiometric amount in these lithium transition metal oxides. In particular, $Li_\alpha Ni_\beta Co_\gamma Al_\delta O_2$ ($1 \leq \alpha \leq 1.2$, $\beta+\gamma+\delta=1$, $\beta \geq 0.7$, and $\gamma \leq 0.2$) or $Li_\alpha Ni_\beta Co_\gamma Mn_\delta O_2$ ($1 \leq \alpha \leq 1.2$, $\beta+\gamma+\delta=1$, $\beta \geq 0.6$, and $\gamma \leq 0.2$) is preferable. The positive electrode active substance can be used alone, or in combination with two or more kinds.

As a positive electrode binder, the same materials for a negative electrode binder can be used. Among these, from the standpoint of versatility and low cost, polyvinylidene fluorides are preferable. The amount of the positive electrode binder used is preferably 2 to 10 parts by mass with respect to 100 parts by mass of the positive electrode active substance from the standpoint of "sufficient binding force" and "high energy" which are trade-off to each other.

As a positive electrode collector, the same materials for a negative electrode collector can be used.

For the purpose of reducing impedance, an electroconductive auxiliary material may be added to a positive electrode active substance layer containing a positive electrode active substance. Examples of the electroconductive auxiliary material include carbonaceous fine particles such as graphite, carbon black, and acetylene black.

[3] Electrolyte Liquid

An electrolyte liquid used in the exemplary embodiment of the invention contains a fluorine-containing cyclic ether compound. In an exemplary embodiment of the invention, the fluorine-containing cyclic ether compound is a cyclic ether compound having at least one fluorine atom.

Examples of the fluorine-containing cyclic ether compound include, for example, a fluorine-containing tetrahydrofuran compound represented by following general formula (1).

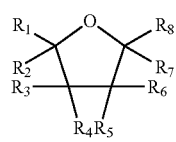

(1)

($R_1$ to $R_8$ are each independently selected from hydrogen atom, fluorine atom, or fluorine-substituted or non-substituted alkyl groups, and at least one of $R_1$ to $R_8$ is selected from fluorine atom or fluorine-substituted alkyl groups.)

Also, examples of the fluorine-containing cyclic ether compound include, for example, a fluorine-containing dioxolane compound represented by following general formula (2).

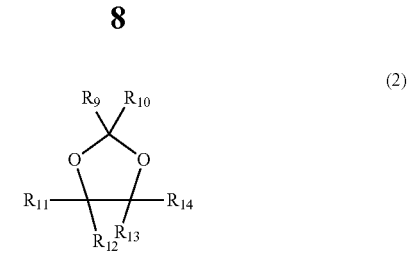

(2)

($R_9$ to $R_{14}$ are each independently selected from hydrogen atom, fluorine atom, or fluorine-substituted or non-substituted alkyl groups, and at least one of $R_9$ to $R_{14}$ is selected from fluorine atom or fluorine-substituted alkyl groups.)

Also, examples of the fluorine-containing cyclic ether compound include, for example, a fluorine-containing tetrahydropyran compound represented by following general formula (3).

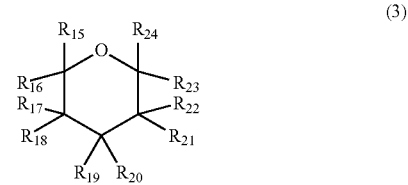

(3)

($R_{15}$ to $R_{24}$ are each independently selected from hydrogen atom, fluorine atom, or fluorine-substituted or non-substituted alkyl groups, and at least one of $R_{15}$ to $R_{24}$ is selected from fluorine atom or fluorine-substituted alkyl groups.)

Also, examples of the fluorine-containing cyclic ether compound include, for example, a fluorine-containing 1,4-dioxane compound represented by following general formula (4).

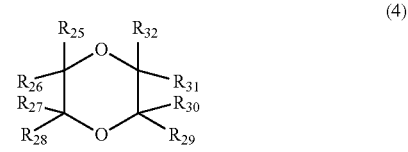

(4)

($R_{25}$ to $R_{32}$ are each independently selected from hydrogen atom, fluorine atom, or fluorine-substituted or non-substituted alkyl groups, and at least one of $R_{25}$ to $R_{32}$ is selected from fluorine atom or fluorine-substituted alkyl groups.)

Also, examples of the fluorine-containing cyclic ether compound include, for example, a fluorine-containing 1,3-dioxane compound represented by following general formula (5).

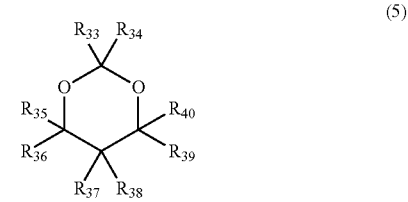

(5)

($R_{33}$ to $R_{40}$ are each independently selected from hydrogen atom, fluorine atom, or fluorine-substituted or non-substituted alkyl groups, and at least one of $R_{33}$ to $R_{40}$ is selected from fluorine atom or fluorine-substituted alkyl groups.)

In above-mentioned general formulae (1) to (5), the alkyl group is preferably an alkyl group with a total carbon number of 1 to 6, is more preferably an alkyl group with a total carbon number of 1 to 4, and is further preferably an alkyl group with a total carbon number of 1 to 3. Also, the alkyl group includes straight-chain alkyl groups or branched-chain alkyl groups, and is preferably a straight-chain alkyl group. Also, the fluorine-substituted alkyl group means an alkyl group where at least one hydrogen atom is substituted by fluorine atom.

Examples of the fluorine-substituted alkyl group include, for example, compounds where at least one hydrogen atom is substituted by fluorine atom in cyclic ether compounds such as tetrahydrofuran, 2-methyltetrahydrofuran, 3-methyltetrahydrofuran, tetrahydropyran, 2-methyltetrahydropyran, 3-methyltetrahydropyran, 4-methyltetrahydropyran, 1,3-dioxolan, 2-methyl-1,3-dioxolan, 4-methyl-1,3-dioxolan, 1,4-dioxane, 2-methyl-1,4-dioxane, 2-ethyl-1,4-dioxane, 2-propyl-1,4-dioxane, 2,3-dimethyl-1,4-dioxane, 1,3-dioxan, 2-methyl-1,3-dioxan, 4-methyl-1,3-dioxan, 5-methyl-1,3-dioxan, 2,4-dimethyl-1,3-dioxan or 4-ethyl-1,3-dioxan. Also, from the standpoint where the fluorine-containing cyclic ether compound is suitably decomposed to form a suitable coating film on the surface of the negative electrode, it is preferable to use a compound where at least one hydrogen atom is substituted by fluorine atom in tetrahydrofuran, tetrahydropyran or 1,4-dioxane. This fluorine-containing cyclic ether compound can be used alone, or in combination with two or more kinds.

Also, the fluorine-containing cyclic ether compound is preferably non-ionic, and preferably functions as a solvent.

An electrolyte liquid generally contains a nonaqueous electrolyte solvent other than a fluorine-containing cyclic ether compound. Examples of the nonaqueous electrolyte solvent include, but should not particularly be limited to, for example, non-protic organic solvents such as: cyclic-type carbonates such as propylene carbonate (PC), ethylene carbonate (EC), butylene carbonate (BC), and vinylene carbonate (VC); linear-type carbonates such as dimethyl carbonate (DMC), diethyl carbonate (DEC), ethyl methyl carbonate (EMC), and dipropyl carbonate (DPC); propylene carbonate derivatives; and aliphatic carboxylates such as methyl formate, methyl acetate, and ethyl propionate. As the nonaqueous electrolyte solvent, cyclic-type or linear-type carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and dipropyl carbonate (DPC) are preferable. The nonaqueous electrolyte solvent can be used alone, or in combination with two or more kinds.

The content of the fluorine-containing cyclic ether compound is not particularly limited, but is preferably 0.1 to 30 mass % with respect to the total amount of the fluorine-containing cyclic ether compound and the nonaqueous electrolyte solvent, and more preferably 1 to 20 mass %. When the content of the fluorine-containing cyclic ether compound is 0.1 mass % or more, a coating film can effectively be formed on the surface of the negative electrode and the impedance can be reduced more effectively. Also, when the content of the fluorine-containing cyclic ether compound is 30 mass % or less, the content of the nonaqueous electrolyte solvent such as ethylene carbonate or propylene carbonate can be made larger to dissolve a supporting salt at a high concentration, which results in suppressing the depletion of the electrolyte liquid.

Also, as mentioned above, in an exemplary embodiment of the invention, it is preferable to use a cyclic-type or linear-type carbonate as a nonaqueous electrolyte solvent. The cyclic carbonate has a higher dielectric constant among organic solvents and a lithium salt used as a supporting salt can be dissolved at a high concentration. On the other hand, when using only a cyclic carbonate, the viscosity may become high. Thus, in the case where the viscosity becomes high, a linear-type carbonate that is a solvent with a low viscosity can be added to make the electrolyte liquid have low viscosity. However, when a carbonate having a carbonate structure is used as an electrolyte liquid, it may be decomposed to generate gas that consists of $CO_2$. Thus, in an exemplary embodiment of the invention, a fluorine-containing cyclic ether compound is added to a carbonate. By this, reductive decomposition of the fluorine-containing cyclic ether compound selectively occurs to suppress generation of gas as well as to form a coating film on the negative electrode. Therefore, in an exemplary embodiment of the invention, the electrolyte liquid preferably contains a fluorine-containing cyclic ether compound and a cyclic-type or linear-type carbonate. From such a standpoint, the content of the fluorine-containing cyclic ether compound is preferably 1 to 30 mass % with respect to the total amount of the fluorine-containing cyclic ether compound and the carbonate, and more preferably 5 to 20 mass %.

An electrolyte liquid further contains a supporting salt. Examples of the supporting salt include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, and $LiN(CF_3SO_2)_2$. The supporting salt can be used alone, or in combination with two or more kinds.

[4] Separator

As a separator, a porous film or a nonwoven cloth of polypropylene, polyethylene or the like can be used. A separator in which these are stacked can also be used.

[5] Package

A package is arbitrarily selected as long as it is stable against an electrolyte liquid and has a sufficient water vapor barrier property. For example, in the case of a stacked laminate type secondary battery, a lamination film of polypropylene, polyethylene or the like which is coated with aluminum or silica is preferably used as a package. In particular, it is preferable to use an aluminum lamination film from the standpoint of suppressing the volume expansion.

In the case of a secondary battery in which a lamination film is used as a package, when gas is generated, distortion of the electrode assembly becomes much larger than in the case of a secondary battery in which a metal can is used as a package. This is because the lamination film is easily deformed by the inner pressure of the secondary battery in comparison with the metal can. Further, in the case of the secondary battery in which a lamination film is used as a package, when it is sealed, the inner pressure of the battery is generally set to be lower than atmospheric pressure. Thus, the battery does not have extra space inside, which can easily and directly cause a volume change of the battery and deformation of the electrode assembly when gas is generated.

However, a secondary battery according to an exemplary embodiment of the invention can prevent the above-mentioned problem. As a result, a stacked laminate type lithium ion secondary battery which is cheap and which is superior in that there is more latitude to increase cell capacity by changing the number of laminations can be provided.

Also, in the case of a secondary battery in which a lamination film is used as the package, when gas is generated, distortion of the electrode assembly becomes much larger than in the case of a secondary battery in which a metal can is used as the package. This is because the lamination film is easily deformed by the inner pressure of the secondary battery in comparison with a metal can. Further, in the case of the secondary battery in which a lamination film is used as the package, when it is sealed, the inner pressure of the battery is generally set to be lower than atmospheric pressure. Thus, the battery does not have extra space inside, which can easily and directly cause a volume change of the battery and deformation of the electrode assembly when gas is generated. As mentioned above, in the case where a carbonate is selected as a nonaqueous electrolyte solvent, the generation of gas may occur. Thus, in an exemplary embodiment of the invention, in the case where the package is a lamination film, a carbonate and a fluorine-containing cyclic ether compound are preferably contained as the electrolyte liquid. By using a fluorine-containing cyclic ether compound which is easy to be decomposed than the carbonate, the generation of gas can be suppressed and a good coating film for the negative electrode can be formed.

EXAMPLE

As follows, an exemplary embodiment of the invention is more specifically explained by the Examples.

Example 1

A silicon having an average particle diameter of 5 μm as metal (a), an amorphous silicon oxide ($SiO_x$, $0<x\leq2$) having an average particle diameter of 13 μm as metal oxide (b), and a graphite having an average particle diameter of 30 μm as carbon material (c) were weighed at a mass ratio of 29:61:10. Then, these materials were mixed by so-called mechanical milling for 24 hours to obtain a negative electrode active substance. Note that, in this negative electrode active substance, the silicon that is metal (a) was dispersed in the silicon oxide ($SiO_x$, $0<x\leq2$) that is metal oxide (b).

The above-mentioned negative electrode active substance (average particle diameter $D_{50}=5$ μm) and a polyimide (produced by UBE INDUSTRIES, trade name: U varnish A) as a negative electrode binder were weighed at a mass ratio of 80:20 and were mixed with n-methylpyrrolidone to prepare a negative electrode slurry. The negative electrode slurry was applied to a copper foil having a thickness of 10 μm and was then dried, and it was further heat-treated under nitrogen atmosphere at 300° C. to produce a negative electrode. Note that, in TABLE 1, the content (%) of the negative electrode binder represents the content (mass %) of the negative electrode binder in the negative electrode active substance and the negative electrode binder.

Lithium nickelate ($LiNi_{0.80}Co_{0.15}Al_{0.15}O_2$) as a positive electrode active substance, carbon black as an electroconductive auxiliary material, and polyvinylidene fluoride as a positive electrode binder were weighed at a mass ratio of 90:5:5. Then, they were mixed with n-methylpyrrolidone to prepare a positive electrode slurry. The positive electrode slurry was applied to an aluminum foil having a thickness of 20 μm and then dried, and it was further pressed to produce a negative electrode.

Three layers of the positive electrode that was obtained and four layers of the negative electrode that was obtained were alternately stacked with a polypropylene porous film as a separator placed therebetween. End parts of the positive electrode collectors which were not covered with the positive electrode active substance and end parts of the negative electrodes collectors which were not covered with the negative electrode active substance were respectively welded. Further, an aluminum positive electrode terminal and a nickel negative electrode terminal were respectively welded thereto, to obtain an electrode assembly which had a planar stacking conformation.

On the other hand, 2-monofluorotetrahydrofuran as a fluorine-containing cyclic ether compound and a carbonate nonaqueous electrolyte solvent were mixed in a ratio of 20 parts by mass and 80 parts by mass, respectively, to prepare a mixed solution. Further, $LiPF_6$ as a supporting salt was dissolved in this mixed solution at a concentration of 1 mol/l to prepare an electrolyte liquid. Note that, a mixed solvent of EC/PC/DMC/EMC/DEC=20/20/20/20/20 (volume ratio) was used as the carbonate nonaqueous electrolyte solvent. Note that, in TABLE 1, (d) represents a fluorine-containing cyclic ether compound, and the content (%) of (d) represents a content (mass %) of the fluorine-containing cyclic ether compound with respect to the fluorine-containing cyclic ether compound and the carbonate nonaqueous electrolyte solvent.

The above-mentioned electrode assembly was enclosed in an aluminum lamination film as a package and the electrolyte liquid was poured thereinto, and it was then depressurized to 0.1 atm and was sealed to produce a secondary battery.
<Evaluation>
(Cycle at 20° C.)

Tests for the secondary batteries produced were carried out in which they were repeatedly charged and discharged within a voltage range of 2.5 V to 4.1 V in a thermostatic oven which was kept at a temperature of 20° C., to evaluate the retention ratio (%) and the swelling (%). The results are shown in TABLE 1. In TABLE 1, "retention ratio (%)" represents (discharged capacity at the $150^{th}$ cycle)/(discharged capacity at the $5^{th}$ cycle)×100 (unit: %). Also, "swelling (volume increase) (%)" represents {volume capacity at the $150^{th}$ cycle)/(volume capacity at the $1^{st}$ cycle)−1}×100(%) (unit: %).

(Cycle at 60° C.)

Tests for the secondary batteries produced were carried out in which the batteries were repeatedly charged and discharged within a voltage range of 2.5 V to 4.1 V in a thermostatic oven which was kept at a temperature of 60° C., to evaluate the retention ratio (%) and the swelling (%). The results are shown in TABLE 1. In TABLE 1, "retention ratio (%)" represents (discharged capacity at the $50^{th}$ cycle)/(discharged capacity at the $5^{th}$ cycle)×100 (unit: %). Also, "swelling (volume increase) (%)" represents {volume capacity at the $50^{th}$ cycle)/(volume capacity at the $1^{st}$ cycle)−1}×100(%) (unit: %).

(3C Rate Property)

The 3C rate properties of the secondary batteries produced were evaluated. The evaluation was carried out as follows. At first, the battery which was charged to full charge was discharged to 2.5 V at 1C rate (discharge for 60 minutes), to evaluate a discharge capacity. Next, after it was charged again to full charge, it was discharged to 2.5 V at 3C rate (3 times higher current value than that of 1C rate, discharge for 20 minutes), to evaluate a discharge capacity. And, the retention ratio (%) was calculated from the obtained discharged capacity at 3C and the obtained discharged capacity at 1C. The results are shown in TABLE 1.

In TABLE 1, "retention ratio (%)" represents (discharged capacity at 3C)/(discharged capacity at 1C) (unit: %).

Examples 2 to 34

Secondary batteries were produced in the same manner as in Example 1 except that the mass ratio of silicon, silicon oxide and graphite, the kind and the content of the negative electrode binder, and the kind and the content of the fluorine-containing cyclic ether compound were selected as shown in TABLES 1 and 2, and the evaluations were carried out. The results are shown in TABLES 1 and 2.

Example 35

A negative electrode active substance which contained silicon, an amorphous silicon oxide ($SiO_x$, $0<x\leq2$) and a carbon at a mass ratio of 29:61:10 was obtained by the same method described in Patent document 3. Note that, in this negative electrode active substance, the silicon that is metal (a) was dispersed in the amorphous silicon oxide that is metal oxide (b). Then, the example was carried out in the same manner as in Example 1 except that this negative electrode active substance was used. The results are shown in TABLE 3.

Example 36

This example was carried out in the same manner as in Example 11 except that the negative electrode active substance used in Example 35 was used. The results are shown in TABLE 3.

Example 37

This example was carried out in the same manner as in Example 15 except that the negative electrode active substance used in Example 35 was used. The results are shown in TABLE 3.

Example 38

This example was carried out in the same manner as in Example 25 except that the negative electrode active substance used in Example 35 was used. The results are shown in TABLE 3.

Comparative Examples 1 to 11

Secondary batteries were produced in the same manner as in Example 1 except that the mass ratio of silicon, silicon oxide and graphite, and the kind and the content of the negative electrode binder were selected as shown in TABLE 4 as well as that the fluorine-containing cyclic ether compound was not used, and the evaluations were carried out. The results are shown in TABLE 4.

Comparative Examples 12 to 26

Secondary batteries were produced in the same manner as in Example 1 except that the mass ratio of silicon, silicon oxide and graphite, and the kind and the content of the negative electrode binder were selected as shown in TABLE 5 as well as that a cyclic ether compound (non-fluorinated) was used instead of the fluorine-containing cyclic ether compound, and the evaluations were carried out. The results are shown in TABLE 5. In TABLE 5, (e) represents a non-fluorinated cyclic ether compound. Note that, in TABLE 5, and the content (%) of (e) represents a content (mass %) of the non-fluorinated cyclic ether compound with respect to the total amount of the non-fluorinated cyclic ether compound and the carbonate nonaqueous electrolyte solvent.

TABLE 1

| | negative electrode | | | | | cycle at 20° C. (150 cyc) | | | | cycle at 60° C. (50 cyc) | | | | 3 C rate property 3 C/1 C | |
|---|---|---|---|---|---|---|---|---|---|---|---|---|---|---|---|
| | | binder | | | content | retention ratio | | swelling <volume> | | retention ratio | | swelling <volume> | | <discharge capacity> | |
| | ratio of Si/SiO/C | kind | content (%) | fluorine-containing cyclic ether compound (d) | (%) of (d) | (%) | J | (%) | J | (%) | J | (%) | J | (%) | J |
| Example 1 | 29/61/10 | PI | 20 | 2-fluorotetrahydrofuran | 20 | 80 | ○ | 2 | ○ | 70 | ○ | 6 | ◎ | 53 | ○ |
| Example 2 | 29/61/10 | PAI | 20 | 3-fluorotetrahydrofuran | 20 | 78 | ○ | 3 | ○ | 68 | ○ | 5 | ◎ | 56 | ○ |
| Example 3 | 29/61/10 | PI | 5 | 2,2-difluorotetrahydrofuran | 10 | 52 | ○ | 6 | ○ | 51 | ○ | 6 | ◎ | 56 | ○ |
| Example 4 | 29/61/10 | PAI | 5 | 2,2-difluorotetrahydrofuran | 10 | 55 | ○ | 5 | ○ | 54 | ○ | 5 | ◎ | 57 | ○ |
| Example 5 | 29/61/10 | PI | 5 | 2,3,4,5-tetrafluorotetrahydrofuran | 10 | 53 | ○ | 6 | ○ | 52 | ○ | 6 | ◎ | 56 | ○ |
| Example 6 | 29/61/10 | PAI | 5 | 2,3,4,5-tetrafluorotetrahydrofuran | 10 | 54 | ○ | 6 | ○ | 54 | ○ | 5 | ◎ | 55 | ○ |
| Example 7 | 29/61/10 | PI | 5 | 2,2,4,4-tetrafluorotetrahydrofuran | 5 | 52 | ○ | 3 | ○ | 53 | ○ | 4 | ◎ | 61 | ○ |
| Example 8 | 29/61/10 | PAI | 5 | 2,2,4,4-tetrafluorotetrahydrofuran | 5 | 52 | ○ | 3 | ○ | 54 | ○ | 5 | ◎ | 60 | ○ |
| Example 9 | 29/61/10 | PI | 5 | 2,2,3,3,4,4,5,5-octafluorotetrahydrofuran | 5 | 55 | ○ | 3 | ○ | 52 | ○ | 6 | ◎ | 58 | ○ |
| Example 10 | 29/61/10 | PAI | 5 | 2,2,3,3,4,4,5,5-octafluorotetrahydrofuran | 5 | 54 | ○ | 4 | ○ | 53 | ○ | 6 | ◎ | 57 | ○ |
| Example 11 | 29/61/10 | PI | 25 | 3-fluorotetrahydropyran | 10 | 65 | ○ | 6 | ○ | 58 | ○ | 4 | ◎ | 56 | ○ |
| Example 12 | 29/61/10 | PAI | 25 | 3-fluorotetrahydropyran | 10 | 66 | ○ | 5 | ○ | 57 | ○ | 3 | ◎ | 55 | ○ |
| Example 13 | 29/61/10 | PI | 25 | 2,2,3,3,4,4,5,5,6,6-decafluorotetrahydropyran | 5 | 67 | ○ | 6 | ○ | 57 | ○ | 5 | ◎ | 57 | ○ |
| Example 14 | 29/61/10 | PAI | 25 | 2,2,3,3,4,4,5,5,6,6-decafluorotetrahydropyran | 5 | 68 | ○ | 6 | ○ | 56 | ○ | 4 | ◎ | 50 | ○ |
| Example 15 | 29/61/10 | PI | 25 | 2,2,3,3,5,5,6,6-octafluoro-1,4-dioxane | 5 | 76 | ○ | 3 | ○ | 69 | ○ | 4 | ◎ | 59 | ○ |
| Example 16 | 29/61/10 | PAI | 25 | 2,2,3,3,5,5,6,6-octafluoro-1,4-dioxane | 5 | 75 | ○ | 3 | ○ | 68 | ○ | 5 | ◎ | 57 | ○ |

J: judgment

TABLE 2

| | negative electrode | | | | | cycle at 20° C. (150 cyc) | | | | cycle at 60° C. (50 cyc) | | | | 3 C rate property 3 C/1 C | |
|---|---|---|---|---|---|---|---|---|---|---|---|---|---|---|---|
| | | binder | | fluorine-containing cyclic | content | retention | | swelling | | retention | | swelling | | <discharge | |
| | ratio of | kind | content (%) | ether compound (d) | (%) of (d) | ratio (%) | J | <volume> (%) | J | ratio (%) | J | <volume> (%) | J | capacity> (%) | J |
| | Si/SiO/C | | | | | | | | | | | | | | |
| Example 17 | 29/61/10 | PI | 25 | 2,2-difluoro-1,4-dioxane | 10 | 69 | ○ | 5 | ○ | 68 | ○ | 6 | ◎ | 51 | ○ |
| Example 18 | 29/61/10 | PAI | 25 | 2,2-difluoro-1,4-dioxane | 10 | 70 | ○ | 5 | ○ | 67 | ○ | 6 | ◎ | 52 | ○ |
| Example 19 | 29/61/10 | PI | 25 | 2,3-difluoro-1,4-dioxane | 10 | 77 | ○ | 5 | ○ | 70 | ○ | 4 | ◎ | 57 | ○ |
| Example 20 | 29/61/10 | PAI | 25 | 2,3-difluoro-1,4-dioxane | 10 | 76 | ○ | 5 | ○ | 69 | ○ | 5 | ◎ | 54 | ○ |
| Example 21 | 29/61/10 | PI | 25 | 2,2,3-trifluoro-1,4-dioxane | 5 | 74 | ○ | 4 | ○ | 72 | ○ | 5 | ◎ | 53 | ○ |
| Example 22 | 29/61/10 | PAI | 25 | 2,2,3-trifluoro-1,4-dioxane | 5 | 77 | ○ | 5 | ○ | 72 | ○ | 3 | ◎ | 55 | ○ |
| Example 23 | 29/61/10 | PI | 25 | 2,2,3,3-tetrafluoro-1,4-dioxane | 5 | 72 | ○ | 3 | ○ | 68 | ○ | 4 | ◎ | 52 | ○ |
| Example 24 | 29/61/10 | PAI | 25 | 2,2,3,3-tetrafluoro-1,4-dioxane | 5 | 70 | ○ | 3 | ○ | 66 | ○ | 3 | ◎ | 55 | ○ |
| Example 25 | 29/61/10 | PI | 25 | 2,3-difluoro-2,3-bis(trifluoromethyl)-1,4-dioxane | 5 | 75 | ○ | 2 | ○ | 69 | ○ | 5 | ◎ | 57 | ○ |
| Example 26 | 29/61/10 | PAI | 25 | 2,3-difluoro-2,3-bis(trifluoromethyl)-1,4-dioxane | 5 | 71 | ○ | 3 | ○ | 67 | ○ | 5 | ◎ | 54 | ○ |
| Example 27 | 29/61/10 | PI | 25 | 2-(trifluoromethyl)-1,4-dioxane | 10 | 71 | ○ | 3 | ○ | 66 | ○ | 5 | ◎ | 54 | ○ |
| Example 28 | 29/61/10 | PAI | 25 | 2-(trifluoromethyl)-1,4-dioxane | 10 | 79 | ○ | 2 | ○ | 71 | ○ | 3 | ◎ | 57 | ○ |
| Example 29 | 29/61/10 | PI | 25 | 2-(1,1,2,3,3,3-hexafluoropropyl)-1,4-dioxane | 5 | 76 | ○ | 3 | ○ | 69 | ○ | 4 | ◎ | 60 | ○ |
| Example 30 | 29/61/10 | PAI | 25 | 2-(1,1,2,3,3,3-hexafluoropropyl)-1,4-dioxane | 5 | 66 | ○ | 2 | ○ | 67 | ○ | 5 | ◎ | 61 | ○ |
| Example 31 | 30/0/70 | PVdF | 5 | 2-fluorotetrahydrofuran | 20 | 79 | ○ | 2 | ○ | 70 | ○ | 3 | ◎ | 57 | ○ |
| Example 32 | 0/30/70 | PVdF | 5 | 2-fluorotetrahydrofuran | 10 | 76 | ○ | 3 | ○ | 72 | ○ | 4 | ◎ | 52 | ○ |
| Example 33 | 30/0/70 | PVdF | 5 | 3-fluorotetrahydropyran | 10 | 66 | ○ | 2 | ○ | 64 | ○ | 5 | ◎ | 51 | ○ |
| Example 34 | 0/30/70 | PVdF | 5 | 3-fluorotetrahydropyran | 20 | 80 | ○ | 2 | ○ | 70 | ○ | 3 | ◎ | 58 | ○ |

J: judgment

TABLE 3

| | negative electrode binder | | | | | cycle at 20° C. (150 cyc) | | | | cycle at 60° C. (50 cyc) | | | | 3 C rate property 3 C/1 C | |
|---|---|---|---|---|---|---|---|---|---|---|---|---|---|---|---|
| | ratio of Si/SiO/C | kind | content (%) | fluorine-containing cyclic ether compound (d) | content (%) of (d) | retention ratio (%) | judgment | swelling <volume> (%) | judgment | retention ratio (%) | judgment | swelling <volume> (%) | judgment | <discharge capacity> (%) | judgment |
| Example 35 | 29/61/10 | PI | 20 | 2-fluorotetrahydrofuran | 20 | 82 | ○ | 3 | ○ | 70 | ○ | 5 | ◎ | 55 | ○ |
| Example 36 | 29/61/10 | PI | 25 | 3-fluorotetrahyydropyran | 10 | 81 | ○ | 5 | ○ | 58 | ○ | 5 | ◎ | 56 | ○ |
| Example 37 | 29/61/10 | PI | 25 | 2,2,3,3,5,5,6,6-octafluoro-1,4-dioxane | 5 | 78 | ○ | 4 | ○ | 69 | ○ | 4 | ◎ | 60 | ○ |
| Example 38 | 29/61/10 | PI | 25 | 2,3-difluoro-2,3-bis(trifluoromethyl)-1,4-dioxane | 5 | 77 | ○ | 3 | ○ | 69 | ○ | 5 | ◎ | 59 | ○ |

TABLE 4

| | negative electrode binder | | | fluorine-containing cyclic ether compound (d) | content (%) of (d) | cycle at 20° C. (150 cyc) | | | | cycle at 60° C. (50 cyc) | | | | 3 C rate property 3 C/1 C <discharge capacity> | |
|---|---|---|---|---|---|---|---|---|---|---|---|---|---|---|---|
| | ratio of Si/SiO/C | kind | content (%) | | | retention ratio (%) | judgment | swelling <volume> (%) | judgment | retention ratio (%) | judgment | swelling <volume> (%) | judgment | (%) | judgment |
| Comparative Example 1 | 29/61/10 | PVdF | 5 | none | 0 | 47 | X | 15 | X | 41 | X | 25 | X | 38 | X |
| Comparative Example 2 | 100/0/0 | PI | 25 | none | 0 | 44 | X | 15 | X | 38 | X | 29 | X | 39 | X |
| Comparative Example 3 | 0/100/0 | PI | 25 | none | 0 | 46 | X | 13 | X | 40 | X | 20 | X | 38 | X |

TABLE 4-continued

| | | negative electrode binder | | fluorine-containing cyclic ether compound (d) | content (%) of (d) | cycle at 20° C. (150 cyc) | | | | cycle at 60° C. (50 cyc) | | | | 3 C rate property 3 C/1 C <discharge capacity> | |
|---|---|---|---|---|---|---|---|---|---|---|---|---|---|---|---|
| | ratio of Si/SiO/C | kind | content (%) | | | retention ratio (%) | judg-ment | swelling <volume> (%) | judg-ment | retention ratio (%) | judg-ment | swelling <volume> (%) | judg-ment | (%) | judgment |
| Comparative Example 4 | 32/68/0 | PI | 25 | none | 0 | 47 | X | 17 | X | 41 | X | 21 | X | 38 | X |
| Comparative Example 5 | 90/0/10 | PI | 25 | none | 0 | 41 | X | 16 | X | 35 | X | 22 | X | 39 | X |
| Comparative Example 6 | 29/61/10 | PI | 25 | none | 0 | 43 | X | 16 | X | 37 | X | 28 | X | 38 | X |
| Comparative Example 7 | 100/0/0 | PAI | 25 | none | 0 | 44 | X | 16 | X | 38 | X | 20 | X | 38 | X |
| Comparative Example 8 | 0/100/0 | PAI | 25 | none | 0 | 46 | X | 14 | X | 40 | X | 22 | X | 39 | X |
| Comparative Example 9 | 32/68/0 | PAI | 25 | none | 0 | 44 | X | 14 | X | 38 | X | 20 | X | 37 | X |
| Comparative Example 10 | 90/0/10 | PAI | 25 | none | 0 | 43 | X | 14 | X | 37 | X | 21 | X | 36 | X |
| Comparative Example 11 | 29/61/10 | PAI | 25 | none | 0 | 42 | X | 15 | X | 36 | X | 22 | X | 35 | X |

TABLE 5

| | | negative electrode binder | | | | cycle at 20° C. (150 cyc) | | | | cycle at 60° C. (50 cyc) | | | | 3 C rate property 3 C/1 C <discharge capacity> | |
|---|---|---|---|---|---|---|---|---|---|---|---|---|---|---|---|
| | ratio of Si/SiO/C | kind | content (%) | cyclic ether compound (e) | content (%) of (e) | retention ratio (%) | J | swelling <volume> (%) | J | retention ratio (%) | J | swelling <volume> (%) | J | (%) | J |
| Comparative Example 12 | 29/61/10 | PVdF | 5 | tetrahydrofuran (non-fluorinated) | 20 | 43 | X | 5 | ○ | 40 | X | 8 | ○ | 30 | X |
| Comparative Example 13 | 100/0/0 | PI | 25 | tetrahydrofuran (non-fluorinated) | 20 | 41 | X | 4 | ○ | 39 | X | 9 | ○ | 31 | X |
| Comparative Example 14 | 0/100/0 | PI | 25 | tetrahydrofuran (non-fluorinated) | 20 | 42 | X | 5 | ○ | 42 | X | 7 | ○ | 29 | X |
| Comparative Example 15 | 29/61/10 | PI | 25 | tetrahydrofuran (non-fluorinated) | 20 | 44 | X | 8 | ○ | 44 | X | 7 | ○ | 28 | X |
| Comparative Example 16 | 29/61/10 | PAI | 25 | tetrahydrofuran (non-fluorinated) | 20 | 43 | X | 5 | ○ | 41 | X | 9 | ○ | 21 | X |
| Comparative Example 17 | 29/61/10 | PVdF | 5 | 1,4-dioxane (non-fluorinated) | 20 | 45 | X | 6 | ○ | 39 | X | 7 | ○ | 32 | X |
| Comparative Example 18 | 100/0/0 | PI | 25 | 1,4-dioxane (non-fluorinated) | 20 | 43 | X | 5 | ○ | 40 | X | 8 | ○ | 30 | X |
| Comparative Example 19 | 0/100/0 | PI | 25 | 1,4-dioxane (non-fluorinated) | 20 | 41 | X | 4 | ○ | 39 | X | 7 | ○ | 31 | X |
| Comparative Example 20 | 29/61/10 | PI | 25 | 1,4-dioxane (non-fluorinated) | 20 | 42 | X | 5 | ○ | 42 | X | 8 | ○ | 29 | X |
| Comparative Example 21 | 29/61/10 | PAI | 25 | 1,4-dioxane (non-fluorinated) | 20 | 44 | X | 7 | ○ | 44 | X | 7 | ○ | 28 | X |
| Comparative Example 22 | 29/61/10 | PVdF | 5 | tetrahydropyran (non-fluorinated) | 20 | 43 | X | 5 | ○ | 41 | X | 7 | ○ | 22 | X |
| Comparative Example 23 | 100/0/0 | PI | 25 | tetrahydropyran (non-fluorinated) | 20 | 44 | X | 6 | ○ | 39 | X | 8 | ○ | 32 | X |
| Comparative Example 24 | 0/100/0 | PI | 25 | tetrahydropyran (non-fluorinated) | 20 | 45 | X | 6 | ○ | 39 | X | 15 | ○ | 33 | X |
| Comparative Example 25 | 29/61/10 | PI | 25 | tetrahydropyran (non-fluorinated) | 20 | 43 | X | 7 | ○ | 39 | X | 16 | ○ | 33 | X |
| Comparative Example 26 | 29/61/10 | PAI | 25 | tetrahydropyran (non-fluorinated) | 20 | 42 | X | 5 | ○ | 40 | X | 13 | ○ | 31 | X |

J: judgment

As shown in TABLES 1 to 5, the secondary batteries produced in Examples 1 to 38 had an excellent retention ratio of the 3C rate property more than those of the secondary batteries produced in Comparative Examples 1 to 26.

Also, as shown in TABLES 1 to 4, the secondary batteries produced in Examples 1 to 38 had an excellent cycle retention ratio more than those of the secondary batteries produced in Comparative Examples 1 to 11.

The present application claims the priority based on Japanese Patent Application No. 2010-196618, filed on Sep. 2, 2010, all the disclosure of which is incorporated herein by reference.

The present invention was explained with reference to embodiments and Examples, but the present invention is not limited to the above-mentioned embodiments and the Examples. In the constituents and the detail of the present invention, various changings which are understood by a person ordinarily skilled in the art can be made within the scope of the invention.

INDUSTRIAL APPLICABILITY

An exemplary embodiment of the invention can be utilized in every industrial field that requires a power supply and in an industrial field concerning a transportation, a storage and a supply of an electrical energy. Specifically, it can be utilized, for examples, for a power supply of a mobile device such as a mobile phone and a laptop computer; a power supply of a moving or a transport medium such as a train, a satellite and a submarine, and which includes an electric vehicle such as an electric car, a hybrid car, an electric motorcycle and an electric power-assisted bicycle; a back-up power supply such as UPS; and a power storage device of an electric power which is generated by solar power generation or wind power generation.

REFERENCE SIGNS LIST a negative electrode
b separator
c positive electrode
d negative electrode collector
e positive electrode collector
f positive electrode terminal
g negative electrode terminal

What is claimed is:

1. A secondary battery, comprising an electrode assembly in which a positive electrode and a negative electrode are oppositely disposed, an electrolyte liquid, and a package which encloses the electrode assembly and the electrolyte liquid inside;
wherein the negative electrode is formed by binding a negative electrode active substance to a negative electrode collector with a negative electrode binder;
wherein the electrolyte liquid comprises a fluorine-containing cyclic ether compound represented by the following formulae (3)

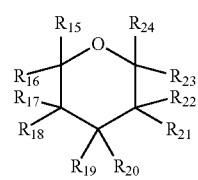

(3)

wherein, in formula (3), $R_{15}$ to $R_{24}$ are each independently selected from among hydrogen atom, fluorine atom, or fluorine-substituted or non-substituted alkyl groups, and at least one of $R_{15}$ to $R_{24}$ is selected from fluorine atom or fluorine-substituted alkyl groups;
wherein the electrolyte liquid further comprises a linear or cyclic carbonate; and
wherein a content of the fluorine-containing cyclic ether compound is 1 to 30 mass % with respect to a total amount of the fluorine-containing cyclic ether compound and the carbonate.

2. The secondary battery according to claim 1, wherein the fluorine-containing cyclic ether compound is a compound in which at least one of hydrogen atoms in tetrahydropyran is substituted by fluorine atom.

3. The secondary battery according to claim 1, wherein the negative electrode active substance comprises at least one selected from among a metal (a) that can be alloyed with lithium, a metal oxide (b) that can absorb and desorb lithium ion, and a carbon material (c) that can absorb and desorb lithium ion.

4. The secondary battery according to claim 3, wherein the negative electrode active substance comprises at least the metal (a).

5. The secondary battery according to claim 3, wherein the negative electrode active substance comprises at least metal oxide (b).

6. The secondary battery according to claim 3, wherein the negative electrode active substance comprises at least carbon material (c).

7. The secondary battery according to claim 3, wherein the negative electrode active substance comprises at least metal oxide (b), and
wherein all or a part of the metal oxide (b) has an amorphous structure.

8. The secondary battery according to claim 3, wherein the negative electrode active substance comprises at least metal (a) and metal oxide (b), and
wherein metal oxide (b) is an oxide of a metal which constitutes the metal (a).

9. The secondary battery according to claim 3, wherein the metal (a) is silicon.

10. The secondary battery according to claim 3, wherein the negative electrode active substance comprises at least metal (a) and metal oxide (b), and
wherein all or a part of the metal (a) is dispersed in the metal oxide (b).

11. The secondary battery according to claim 1, wherein the negative electrode binder is a polyimide or a polyamide-imide.

12. The secondary battery according to claim 1, wherein the electrode assembly has a planar stacking conformation.

13. The secondary battery according to claim 1, wherein the package is an aluminum lamination film.

14. The secondary battery according to claim 1, wherein the electrolyte liquid further comprises the linear carbonate.

15. The secondary battery according to claim 1, wherein the electrolyte liquid further comprises the cyclic carbonate.

16. The secondary battery according to claim 14, wherein the linear carbonate comprises at least one selected from the group consisting of dimethyl carbonate (DMC), diethyl carbonate (DEC), ethyl methyl carbonate (EMC), and dipropyl carbonate (DPC).

17. The secondary battery according to claim 15, wherein the cyclic carbonate comprises at least one selected from the group consisting of propylene carbonate (PC), ethylene carbonate (EC), butylene carbonate (BC), and vinylene carbonate (VC).

18. The secondary battery according to claim 1, wherein the fluorine-containing cyclic ether compound comprises at least one compound in which at least one of hydrogen atoms in a compound selected from among tetrahydropyran, 2-methyltetrahydropyran, 3-methyltetrahydropyran and 4-methyltetrahydropyran is substituted by fluorine atom.

19. The secondary battery according to claim 1, wherein a content of the fluorine-containing cyclic ether compound is 5 to 20 mass % with respect to a total amount of the fluorine-containing cyclic ether compound and the carbonate.

* * * * *